Oct. 5, 1937. A. HERZ 2,094,887
METERING MEANS AND APPARATUS THEREFOR
Filed Sept. 30, 1935
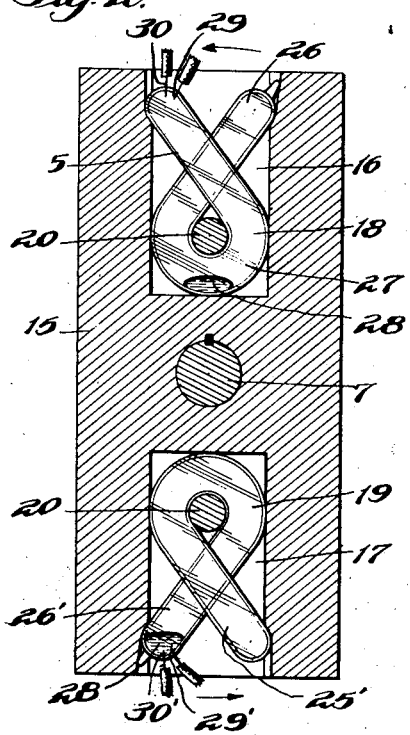
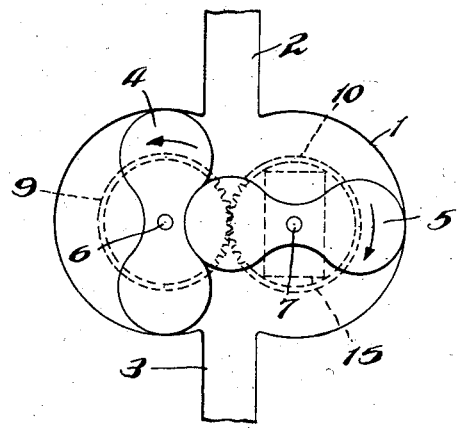
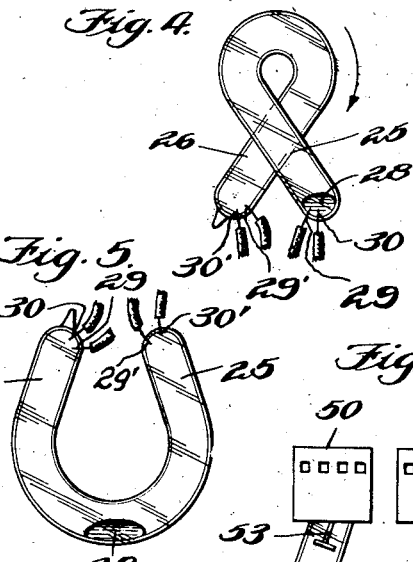
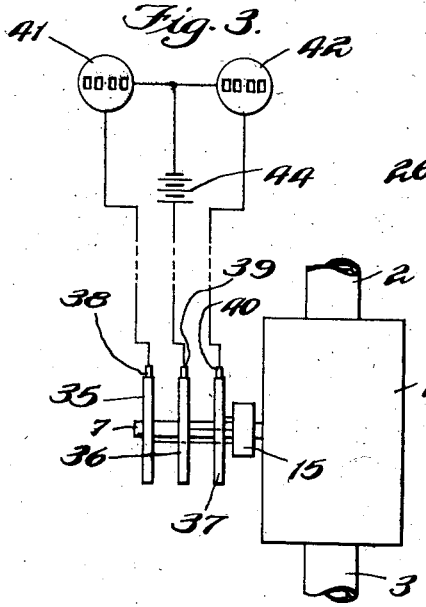
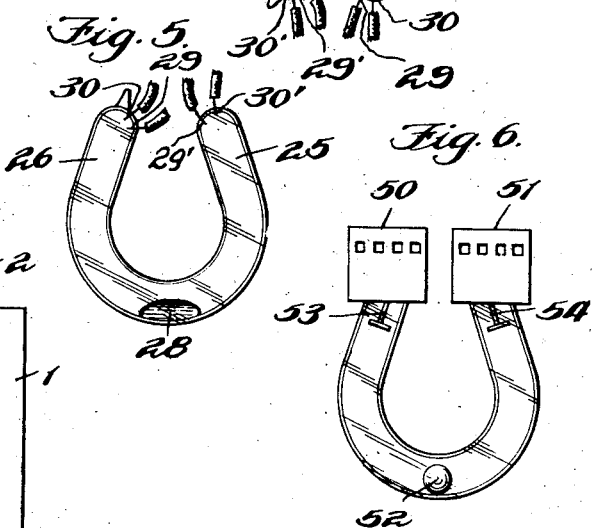
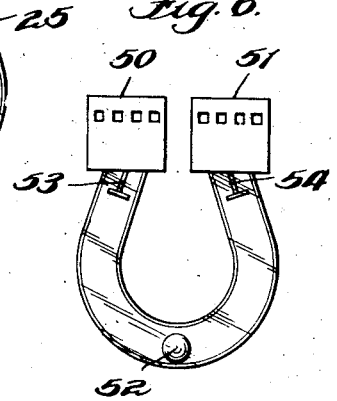
INVENTOR.
Alfred Herz
BY Morris Spector
ATTORNEY.

Patented Oct. 5, 1937

2,094,887

UNITED STATES PATENT OFFICE 2,094,887

METERING MEANS AND APPARATUS THEREFOR

Alfred Herz, Chicago, Ill.

Application September 30, 1935, Serial No. 42,798

12 Claims. (Cl. 73—232)

This invention relates to metering in general, and more particularly to means for metering or registering operations at a remote point. In its more specific aspects the present invention is concerned with the separate registration of the forward and reverse operations of a gas meter in a system where the direction of the flow of gas is reversible.

In certain gas lines, such as a line interconnecting two systems, the flow of gas is sometimes in one direction and sometimes in the other. It is desirable to meter the gas flowing in one direction and to meter the gas flowing in the reverse direction. One common way of doing this is to provide two gas meters, one of which is effective only when the gas flow is in one direction and the other only when the flow is in the opposite direction. Such a metering arrangement is, of course, expensive. I propose to effect such metering by the use of a single gas meter. I use a meter which operates with equal efficiency in either direction, and I provide means for totalizing the number of revolutions of the meter in each direction. The totalizing means comprises two electric switches that are rotated by the gas meter, and are so constructed that each switch closes and opens its circuit once per revolution if rotated in one direction and not at all if rotated in the other direction. One of the switches is effective when the meter rotates in one direction and the other when the meter rotates in the other direction. Separate totalizing counters are provided for registering the operations of the two switches.

It is a further object of the present invention to provide means for totalizing the forward and reverse movements of any rotatable member.

It is a still further object of the present invention to provide a simple and economical switch which will open and close a circuit if it is rotated in one direction and will be ineffective if rotated in the reverse direction.

It is a still further object of the present invention to provide a simple and economical switch which will selectively open and close one of two circuits repeatedly as it is rotated, the circuit selected being determined by the direction of rotation.

The attainment of the above and further objects of the present invention will be apparent from the following specification taken in conjunction with the accompanying drawing forming a part thereof.

In the drawing:

Figure 1 is a diagrammatic view of a portion of a gas meter interconnecting two gas systems, and to which my invention has been applied;

Figure 2 is a cross sectional view illustrating two switches mounted in a block of wood that is itself mounted on one of the rotatable elements of the meter;

Figure 3 is a circuit diagram of the electrical connections for indicating the meter operation at a remote point;

Figure 4 illustrates a modified form of switch;

Figure 5 illustrates still another form of switch; and

Figure 6 illustrates another embodiment of my invention.

Reference may now be had more particularly to the system shown in Figure 1. In this figure I have illustrated, at 1, a standard form of gas meter interconnecting two gas systems one of which is connected to the meter at 2 and the other of which is connected to the meter at 3. Gas may flow from the system 2 to the system 3, or from the system 3 to the system 2. The meter includes two rotatable members, 4 and 5, mounted, respectively, on shafts 6 and 7, and so arranged that a fixed quantity of gas passes through the meter per revolution of the shafts 6 and 7. This type of meter operates with equal efficiency in either direction. The arrows in Figure 1 indicate the direction of rotation of the members 4 and 5 when the gas flows from the system 2 to the system 3. When the direction of gas flow is reversed, the members 4 and 5 rotate in the opposite direction. The shafts 6 and 7 are geared together by a pair of gears, 9 and 10, to facilitate action of the meter. This much of the system, including the meter, is well known in the art and does not form a part of my invention, except in combination with the parts hereafter mentioned.

A block 15 is keyed to the shaft 7 to be rotated thereby. This block carries a pair of mercury switches and is of a construction such as is illustrated more fully in Figure 2. While I have shown the block keyed directly to the shaft 7, the connection may be indirect. Two small pockets, 16 and 17, are formed at the opposite ends of the block, said pockets being adapted to receive mercury switches 18 and 19. The switches are secured in the pockets in any desired manner, in this instance by means of removable pins 20—20. Another simple way of holding the switches in the pockets would be to fill the pockets with a plastic compound which hardens, such as plaster of Paris, thereby permanently imbedding the switches in the pockets.

The switches 18 and 19 are of similar construction, and a description of one will suffice also for the other. The switch 18 comprises a continuous glass tube bent upon itself to form two legs 25—26 joined by a bight portion 27. Within the tube is a globule of mercury 28. A pair of contacts 29—30 are located at the end of one of the legs 25 in spaced relationship, and so arranged that the contacts are bridged by the mercury when the mercury moves into that leg upon rotation of the block 15. The tube may be filled with an inert gas, if desired, and is sealed.

Consider the switch 18. If the block 15 is rotated in a direction clockwise, as seen in Figure 2, the mercury will flow into the leg portion 25 and bridge the contacts 29—30 once during each revolution of the block 15. The mercury will flow into the leg 25 when the block is rotated through an angle somewhat less than 135° from the position shown, and will remain in that leg for approximately the subsequent 180° rotation of the block. Further rotation will cause the mercury to flow out of the leg 25 and into the bight portion 27, but it will not flow into the leg 26. Continued rotation of the block in a clockwise direction will cause a repetition of this cycle once per revolution of the block, thereby effecting a closure of the contacts 29—30 once during each revolution of the block.

If the block is rotated counter-clockwise from the position shown in Figure 2 the mercury will flow into the leg 26 and, during each revolution of the block, will repeat, in the leg 26, substantially the same cycle which was described above for the leg 25 on clockwise rotation. It is thus apparent that if the block is rotated clockwise the mercury will bridge the contacts 29—30 once during each revolution of the block, while if the block is rotated counter-clockwise, the mercury will not bridge the contacts 29—30.

The switch 19, as previously stated, is of the same construction as the switch 18, differing therefrom only in that in this switch the contacts 29'—30' are located in the leg 26', which corresponds to the leg 26 of the switch 18. Therefore the switch 19 will close its contacts once per revolution upon counter-clockwise rotation of the block, and will not close its contacts at all upon clockwise rotation of the block. It is thus apparent that for each revolution of the shaft 7 one or the other of the two pairs of the contacts will be closed, depending upon the direction of the rotation of the shaft.

Reference may now be had more particularly to Figure 3 illustrating the circuit connections for effecting desired metering operations. Three slip rings 35, 36, and 37 are secured to the meter operated shaft 7, but insulated therefrom. Wires leading from the contacts 29—30 of the switch 18 are connected, respectively, to the middle slip ring 36 and to the right end slip ring 37, whereas the wires from the corresponding contacts of the switch 19 are connected, respectively, to the middle slip ring 36 and the left end slip ring 35. Brushes 38, 39, and 40 engage the respective slip rings and establish circuits to impulse counters 41 and 42, which may be located at a remote point and connected to the brushes over telephone wires. Each of the brushes 38, 39, and 40 may comprise two physically separate members electrically connected in parallel and spaced from one another circumferentially of the rings, so that accidental momentary separation of either brush from the ring will not interrupt the circuit and cause false reading of the counter. The brush 39 is connected, through a battery 44, to one terminal of both impulse counters. The brush 38 is connected to the counter 41, and the brush 40 is connected to the counter 42. If desired, the connection between the brush 39 and the battery 44 may be by way of ground, instead of through a metallic wire, thereby using a two wire circuit.

From the description thus far given it is apparent that each time the contacts 29—30 close, a circuit is established by way of the brushes 39—40 to the meter 42, whereas each time the contacts 29'—30' close, a similar circuit is established by way of brushes 38—39 to the impulse counter 41. The counter 41 therefore indicates the total number of revolutions that the meter 1 made in one direction and the counter 42 indicates the total number of revolutions that the meter made in the opposite direction. Since each revolution of the meter indicates a fixed quantity of gas transferred from one system to the other, it is apparent that the two counters 41 and 42 will indicate the total gas transfer between the systems in each direction, and they may be calibrated accordingly.

The leg portion 25 of the switch 18 corresponds, functionally, to any mercury switch insofar as concerns the contacts 29—30 and, therefore, any desired construction may be used for effecting an establishment and interruption of the circuit between the contacts 29—30 as the mercury flows into and out of the leg 25. The circuit may be interrupted between the mercury and the contacts, which are of iron, or the interruption may be by causing the mercury to break the circuit in any other known way. Such mercury switches are well known in the art, and any such structure may be incorporated in the leg 25. The same applies to the leg 26'.

In Figure 4 I have illustrated an arrangement which differs from that of Figure 2 in that a single switch may be used to accomplish the results of the two switches 18 and 19. This result is attained by housing the contacts 29'—30' in the leg 26 of the same switch that has the contacts 29—30 in the leg 25.

In Figure 5 I have shown an arrangement which differs from Figure 4 only in that the legs of the glass tube are bent towards one another by a lesser amount than in the switch shown in Figure 4, so that this switch may be passed over a shaft or pin corresponding to the pin 20 of Figure 2.

In Figure 6 I have shown an arrangement whereby a rolling mass, corresponding to the globule of mercury 28, is effective to actuate either of two impulse counters 50 or 51, directly, instead of through an electric circuit. In this construction the mass 52, which corresponds to the mass of mercury 28, comprises a ball which is adapted to actuate a plunger 53 of an impulse counter 50, or a plunger 54 of an impulse counter 51.

If the mechanism shown in Figure 6 is rotated in a clockwise direction the ball 52 will actuate the plunger 54 once during each revolution of the apparatus, and will not actuate the plunger 53 at all. Upon reverse rotation of the apparatus the plunger 53 will be actuated once per revolution, and the plunger 54 will not be actuated.

The legs 25—26 are convergent in order to form an upwardly extending obstruction to the flow of mercury when the switch is in certain positions during rotation. The equivalent result may be obtained by other known obstructions. The mechanism may be rotated by a gas meter, or by any other rotating member whose forward and reverse motions are to be totalized.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. In combination with a meter adapted to meter fluid flowing therethrough in either direction and having a rotatable meter element rotatable in a direction determined by the direction of fluid flow through the meter, a pair of electrically controlled impulse counters, electric circuit connections extending from the meter to the counters, and means driven by the rotatable meter element for sending current impulses over the circuit connections to one of the counters only upon rotation of the meter element in one direction and for sending impulses to the other counter only upon rotation of the meter element in the other direction, said last named means including a pair of gravity actuated electric switches mounted on a common support for joint rotation through more than one revolution and driven by the meter element and controlling the counters, at least one switch including means for preventing sending of impulses when it is rotated in one certain direction, said counters being separate from the meter, and slip rings in the circuit connections between the switches and the counters.

2. A device adapted to be connected to and driven by a rotating member to count its revolutions, said device comprising a tube bent to form a pair of leg portions joined by an intermediate portion, said leg portions being closed at their ends remote from the intermediate portion, said tube being mounted for rotation by said rotating member, a movable mass in the tube and movable therein by gravity as the tube is turned, said mass being movable into either leg from the intermediate portion as the tube is turned, and being returned to the intermediate portion as the turning of the tube is continued, the two legs of the tube being convergent toward one another from the intermediate portion so that upon return movement of the mass to the intermediate portion from either leg a continuation of the movement to the other leg is prevented as long as the direction of rotation remains the same, whereby the mass moves back and forth in only one leg and the intermediate portion when the tube is rotated in one direction and in only the other leg and the intermediate portion upon rotation in the opposite direction, and counting means associated with at least one of the legs and controlled by the movable mass to count the number of times the movable mass moved back and forth in said one leg.

3. A device adapted to be connected to and driven by a rotating member to count its revolutions, said device comprising a tube closed at its two ends and bent to form a pair of leg portions joined by an intermediate portion, said tube being mounted for rotation by said rotating member, a movable mass in the tube and movable therein by gravity as the tube is turned, said mass being movable into either leg from the intermediate portion as the tube is turned, and being returned to the intermediate portion as the turning of the tube is continued, the two legs of the tube being convergent toward one another from the intermediate portion so that upon return movement of the mass to the intermediate portion from either leg a continuation of the movement to the other leg is prevented as long as the direction of rotation remains the same, whereby the mass moves back and forth in only one leg and the intermediate portion when the tube is rotated in one direction and in only the other leg and the intermediate portion upon rotation in the opposite direction, and separate counting means associated with each leg and controlled by the movable mass for counting the number of times that the movable mass moved back and forth in the respective legs, thereby separately totalizing the forward and reverse rotations of the first mentioned rotating member.

4. A device adapted to be connected to and driven by a rotating member to count its revolutions, said device comprising a tube closed at its two ends and bent to form a pair of leg portions joined by an intermediate portion, said tube being mounted for rotation by said rotating member, a movable mass in the tube and movable therein by gravity as the tube is turned, said mass being movable into either leg from the intermediate portion as the tube is turned, and being returned to the intermediate portion as the turning of the tube is continued, the two legs of the tube being convergent toward one another from the intermediate portion so that upon return movement of the mass to the intermediate portion from either leg a continuation of the movement to the other leg is prevented so long as the direction of rotation remains the same, whereby the mass moves back and forth in only one leg and the intermediate portion when the tube is rotated in one direction and in only the other leg and the intermediate portion upon rotation in the opposite direction, electric switch contacts in one of said legs and controlled by said movable mass upon movement of the same in said one leg, slip rings rotatable with said tube and connected to the said contacts, brushes for the slip rings, an impulse counter, and circuit connections for controlling the impulse counter, said connections including the brushes, slip rings, and switch contacts.

5. In combination, a switch mounted for unlimited rotation in either direction and including means forming a mercury chamber, mercury in said chamber, contact means in said chamber and adapted to be bridged by the mercury once during each revolution of the switch in one direction, means for preventing contact making movement of the mercury in said chamber upon reverse rotation of the switch, said last mentioned means comprising means forming a second chamber into which the mercury drains upon reverse rotation of the switch, and means for counting the revolutions of said switch in said one direction comprising an impulse counter and means controlled by the contact means in the chamber for actuating the counter.

6. A switch comprising a tube bent to form a pair of leg portions joined by a bight portion, a mass of mercury in the tube and movable from the bight portion into either leg portion, the leg portions being closed from one another at their ends opposite the bight portion whereby the end closures limit the extent of movement of the mercury in one direction in each leg, the leg portions converging towards one another from the bight portion and crossing one another, and contact means in at least one of the leg portions adapted to be bridged by the mercury when the tube is turned to cause the mercury to flow into that leg.

7. A switch comprising a tube bent to form a pair of leg portions joined by a bight portion, a mass of mercury in the tube and movable from the bight portion into either leg portion, the leg portions converging towards one another from the bight portion and each leg being closed off from the other at its end remote from the bight portion, and contact means in at least one of the leg portions adapted to be bridged by the mercury when the tube is turned to cause the mercury to flow into that leg, the tube being mounted for rotation and being rotatable in either direction more than a complete revolution, an electric impulse counter, and circuit connections for the counter controlled by said contact means.

8. A switch comprising a tube having two mercury receiving chambers connected at one end and closed off from one another at their opposite end, a mass of mercury in the tube and movable in the two chambers, one of said chambers having contacts adapted to be bridged by the mercury, said tube being mounted for unlimited turning in either direction so that the two chambers are alternately above and below one another and at varying inclinations to the horizontal upon rotation of the switch more than one revolution in either direction, whereby the mercury moves back and forth when the tube is turned, the two chambers being at such an angle to one another that the mercury moves back and forth at the contacts in one of said chambers when the tube is rotated in one direction, and upon reverse rotation of the tube the mercury moves back and forth in the other chamber and is unable to reach said contacts.

9. An electric switch mounted for unlimited rotation in either direction and adapted to actuate a circuit during each revolution upon rotation in one direction and ineffective to actuate that circuit upon rotation in the opposite direction, said switch comprising a continuous tube bent to form a central portion and two end sections and a mass of material in the tube and movable therein by gravity as the tube is rotated, electric contact means controlled by said mass when the same moves into one section of the tube, said two sections being inclined from the central portion towards one another and being closed at their respective ends remote from the central portion so that upon continuous rotation in one direction the mass moves back and forth in one section but not in the other, whereas upon reverse rotation the mass moves back and forth in the other section but not in the said one section.

10. In combination with a rotatable shaft capable of rotation through more than two revolutions in each direction, impulse sending means rotated by the shaft and comprising a block, a pair of mercury switches carried by the block on opposite sides of the axis of rotation thereof, each of said switches including contact making means effective during each rotation in one direction and means for rendering the contact making means ineffective upon reverse rotation of the shaft, the two switches being oppositely related whereby one of the contact making means is effective only during rotation in one direction and the other contact making means is effective only during rotation in the other direction.

11. In combination with a rotatable shaft, a block mounted on the shaft at the center of the block, said block having two pockets formed therein and located on opposite sides of the center of rotation thereof, and gravity actuated electric switches mounted in the pockets, each switch comprising a tube bent to form a central portion and a pair of legs converging towards one another from the central portion and a movable mass in said tube, said mass reciprocating in one leg upon rotation of the shaft in one direction and remaining out of said one leg upon rotation of the block in the opposite direction, and electric circuit making means in said one leg controlled by the reciprocation of said movable mass in said one leg.

12. In combination with a rotatable shaft, a block mounted on the shaft at the center of the block, said block having two pockets formed therein and located on opposite sides of the center of rotation thereof, and gravity actuated electric switches mounted in the pockets, each switch comprising a tube bent to form a central portion and a pair of legs converging towards one another from the central portion and a movable mass in said tube, said mass reciprocating in one leg upon rotation of the shaft in one direction and remaining out of said one leg upon rotation of the block in the opposite direction, and electric circuit making means in said one leg controlled by the reciprocation of said movable mass in said one leg, the switches in the pockets on the opposite sides of the block being oppositely related whereby the contact making means in one switch is actuated only upon rotation of the block in one direction and the contact making means of the other switch is actuated only upon rotation of the block in the opposite direction.

ALFRED HERZ.